US012149935B1

(12) United States Patent
Monteagudo Notario

(10) Patent No.: US 12,149,935 B1
(45) Date of Patent: Nov. 19, 2024

(54) ATTESTING FOR GEOGRAPHIC LOCATIONS OF COMMUNICATION DEVICES

(71) Applicant: Amazon Technologies, Inc., Seattle, WA (US)

(72) Inventor: Pablo Monteagudo Notario, Madrid (ES)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 261 days.

(21) Appl. No.: 17/835,597

(22) Filed: Jun. 8, 2022

(51) Int. Cl.
*H04W 12/069* (2021.01)
*H04W 4/02* (2018.01)
*H04W 12/63* (2021.01)

(52) U.S. Cl.
CPC ........... *H04W 12/069* (2021.01); *H04W 4/02* (2013.01); *H04W 12/63* (2021.01)

(58) Field of Classification Search
CPC ...... H04W 12/069; H04W 4/02; H04W 12/63
See application file for complete search history.

(56) References Cited

U.S. PATENT DOCUMENTS

| 2015/0281888 A1* | 10/2015 | Muttik | H04L 9/0891 |
| | | | 455/456.1 |
| 2017/0127373 A1* | 5/2017 | Deshpande | H04W 12/069 |
| 2017/0353320 A1* | 12/2017 | Yang | H04L 9/3268 |

* cited by examiner

*Primary Examiner* — Joe Chacko
(74) *Attorney, Agent, or Firm* — Perilla Knox & Hildebrandt LLP; Thomas B. Hildebrandt

(57) ABSTRACT

Techniques for a location service to determine geographic locations (or "geolocations") of user devices connected to a telecommunications network, and provide signed certificates that attest to the user devices being at geolocations at particular times. The location service may calculate, or receive, geolocations of user devices that have been determined using network-based localization techniques for telecommunications networks where the network infrastructure is used to determine the geolocations. Because user devices cannot fake or spoof these geolocations, the location service may populate certificates with indications of geolocations of user devices at different times. Additionally, the location service may act as a certificate authority by digitally signing these certificates and issuing digitally signed certificates that attest to geolocations of user devices. These digitally signed certificates can be presented with the guarantee that they have not been modified since they were issued, and that the information in the signed certificate is trustworthy.

17 Claims, 11 Drawing Sheets

400 ⟶

Geolocation Digital Certificate
ID: NON4ORN340V9QC9F42FI0

| SHARE CERTIFICATE 402 | VALIDATE CERTIFICATE 404 |

MAIN 406

NON4ORN340V9QC9F42FI0
SIGNED BY:
    LOCATION SERVICE
TIME/DATE: 15H 22MIN 42S GMT / 07-02-2021
LOCATION: AG. ASOMATON, ATHINA 105 55, GREECE
COORDINATES: 39.3910411233432 N, 23.454435434655 E (ACCURACY: 5 M)

USER DATA 408

DIGITAL CERTIFICATE USER NAME: USER A
NATIONAL ID OR PASSPORT: 900945024542-H
EMAIL ADDRESS: USERA@EMAIL.COM
SIM CARD ID: 56104563215894225980
IP ADDRESS 149/46.91/44 (TELECOM PROVIDER)
NETWORK / CELL NAME AS34429 TELECOM PROVIDER

PICTURE DATA (OPTIONAL) 410

SHOOTING DATE/TIME: FEBRUARY 7, 2021, AT 15:32:05 GMT
FORMAT JPEG 1440X1920 8-BIT SRGB, RATIO 1.22, PORTRAIN (339 KB)
SHA-256 FINGERPRINT
456844D988375F22F5FC2845A12FBD9FAF534F6D991661CC6F80B59E74B1DC56

SIGNED CERTIFICATE 118

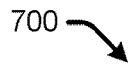

```
┌─────────────────────────────────────────────────────────────┐
│  OBTAIN GEOLOCATION DATA FROM A TELECOMMUNICATIONS NETWORK  │
│   THAT INDICATES A GEOLOCATION OF A USER DEVICE AT A        │
│                      PARTICULAR TIME                        │
│                            702                              │
└─────────────────────────────────────────────────────────────┘
                              │
                              ▼
┌─────────────────────────────────────────────────────────────┐
│  POPULATE A CERTIFICATE WITH INDICATIONS OF THE GEOLOCATION │
│  OF THE USER DEVICE AND THE TIME AT WHICH THE USER DEVICE   │
│                    WAS AT THE GEOLOCATION                   │
│                            704                              │
└─────────────────────────────────────────────────────────────┘
                              │
                              ▼
┌─────────────────────────────────────────────────────────────┐
│  SIGN THE CERTIFICATE USING A PRIVATE KEY ASSOCIATED WITH   │
│   THE LOCATION SERVICE TO GENERATE A SIGNED CERTIFICATE     │
│                            706                              │
└─────────────────────────────────────────────────────────────┘
                              │
                              ▼
┌─────────────────────────────────────────────────────────────┐
│  OUTPUT THE SIGNED CERTIFICATE TO THE USER DEVICE OR        │
│              ANOTHER COMPUTING DEVICE                       │
│                            708                              │
└─────────────────────────────────────────────────────────────┘
```

FIG. 7

ATTESTING FOR GEOGRAPHIC LOCATIONS OF COMMUNICATION DEVICES

BACKGROUND

Modern user devices provide many useful services to users via applications that are installed on their devices. User simply download these applications onto their devices and the users are able to access many different, useful services. For instance, users can download various location applications that provide different forms of location services, such as applications that provide users with directions or maps, applications that help users locate lost devices, applications that allow third parties to monitor the movement of other devices (e.g., parents monitoring their children's movements), and so forth. To provide these services, these applications harness Global Positioning System (GPS) receivers in the user devices to determine geographic locations (or "geolocations") of the user devices. Generally, GPS is a radio navigation system that uses radio waves communicated between satellites and GPS receivers within the user devices to enable the user devices to calculate their respective geolocations.

While it is not an issue for these applications on user devices to harness these on-board GPS receivers to calculate the geolocation of the devices, geolocations determined locally on the user devices cannot be relied upon by third parties as trustworthy assertions of geolocations of the user devices. Specifically, because the GPS receivers on user devices are used to calculate the geolocations locally on the devices, the user devices can be configured to fake their GPS locations, and this has degraded the ability of third parties to trust user devices that share geolocation data to prove where the user devices were at certain times.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates an example of a signed digital certificate that includes and attests to a geolocation of a user device, a time at which the user device was at the geolocation, user data, and picture data taken at the geolocation.

FIG. 7 illustrates a flow diagram of an example method for a location service to obtain a geolocation of a user device, populate a certificate with the geolocation and associated time, sign the certificate, and output the signed certificate.

DETAILED DESCRIPTION

Figure 1:
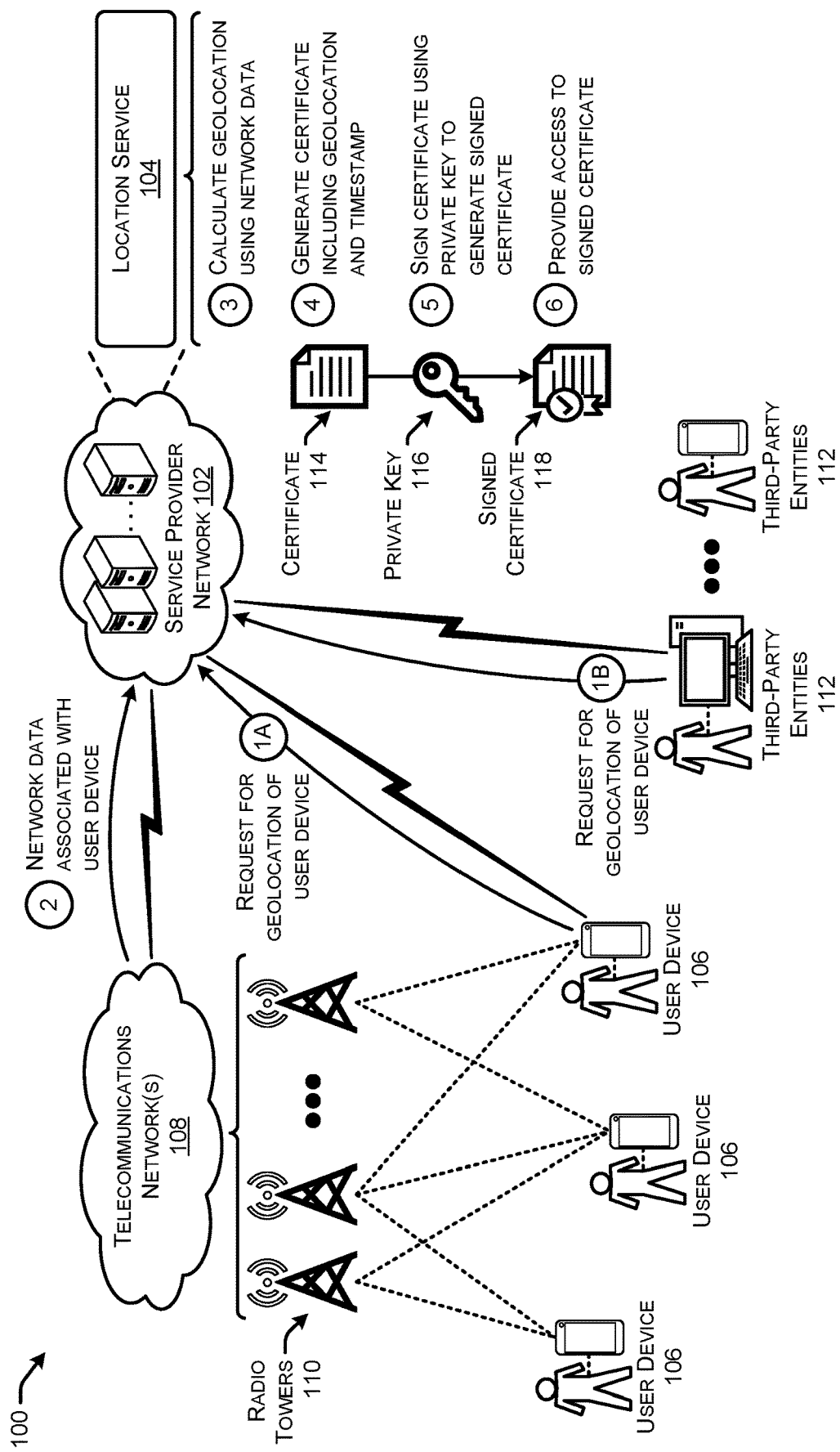
FIG. 1 illustrates a system-architecture diagram of an example environment in which a location service determines geolocations of user devices at different times, signs certificates that include the geolocations and times, and provides the signed certificates to various entities to attest that the devices were at particular geolocations at particular times.

The present disclosure relates to systems and techniques for a location service to determine geographic locations (or "geolocations") of user devices connected to a telecommunications network, and provide digitally signed certificates that attest to the user devices being at the geolocations at particular times. Many user devices use Global Positioning System (GPS) receivers to calculate geolocations of the devices, but these geolocations or timestamp data can be faked due to them being calculated locally on the devices. The location system may calculate, or receive, geolocations of user devices that have been determined using network-based localization techniques for telecommunications networks where the network infrastructure is used to determine the geolocations, and not the user device. Because user devices cannot fake or spoof these geolocations, the location service can rely on this information and may populate certificates with this geolocation information indicating geolocations of user devices at different times. Additionally, the location service may act as a certificate authority by digitally signing these certificates and issuing digitally signed certificates that attest to geolocations of user devices at different times. These digitally signed certificates can be presented to various users or entities with the guarantee that they have not been modified since they were issued, and that the information in the signed certificates is trustworthy.

The location service may be provided by, or managed by, a service provider that acts as a Trust Service Provider (TSP) of digital certificates that attest to the truthfulness of user devices being at geolocations at specified times. The service provider may offer additional services as well, including cloud-based services that may support the location service. As described herein, the location service may be a computing device, or a system of computing devices, that include and execute components configured to perform the operations described herein for attesting to geolocations of user devices. Additionally, the location service monitors or determines the geolocation of user devices that have registered for, or opted in for, use of the location service.

To determine geolocations of user devices, the location service may receive network data, or geolocation data, from a telecommunications network. The telecommunications network may generally be any network over which user devices communicate, and where the networking infrastructure is primarily responsible for determining the geolocation of user devices in the network. For instance, the telecommunications network may be a cellular network, or mobile network, such as a fifth-generation (5G) cellular network, a fourth-generation (4G) cellular network, a 4G Long Term Evolution (LTE) cellular network, and so forth. User devices send signals to radio towers and/or other network devices in telecommunications networks by pinging devices in the network infrastructure to determine their location, or simply by communicating over the network infrastructure (e.g., phone calls, text messages, etc.). There are many techniques used by telecommunications networks to determine geographic locations or positions of the user devices relative to the network devices, such as using Received Signal Strength Indicators (RSSIs) or other power measurements for communicated signals, round-trip-time (RTT) or latency of signals, difference of arrival (DOA) measurements for signals, beamforming techniques, triangulation techniques and/or various other techniques. To determine locations of user devices, the user devices are generally needed to communicate signals with devices in the telecommunications network infrastructure, but the actual calculating or determining of the geolocations for user devices is performed by devices of the telecommunications network (and/or control plane systems).

Accordingly, the location service may receive network data and/or geolocation data from telecommunications networks to determine geolocations of user devices. In some instances, the telecommunications networks may be owned, managed, and/or operated by a same service provider as the location service. However, the telecommunications network may be owned, managed, and/or operated by a different service provider that provides the data or information to the location service. Depending on the use case, the location service may periodically, continuously, or on an on-demand basis, obtain network data and/or geolocation data from the telecommunications network. In some examples, the location service may simply receive geolocation data indicating a geolocation of a user device that as already calculated by the telecommunications network (e.g., longitudinal/latitudinal coordinates, physical addresses, etc.). Additionally, or alternatively, the telecommunications network may provide the location service with the raw network data that the location service can then use to calculate or determine geolocations of user devices. The network data may include various information, such as RTT or latency measurements of signals, power measurements (e.g., RSSIs), DOA measurements, locations of networking infrastructure, and/or other information usable to calculate the geolocations of user devices connected to a telecommunications network.

Once the location service has received, and/or calculated, the geolocation of a user device, the location network may then populate a certificate (or any piece of data) with an indication of the geolocation of the user device, and optionally the time at which the user device was at the geolocation. Additionally, the location service may populate the certificate with various other information, such as image data associated with an image, video, and/or picture provided by the user device that was generated by a camera associated with the user device at the geolocation. For instance, a user of the user device may desire that an image, video, and/or picture created using their user device is included in a digitally signed certificate to prove that the image data was in fact generated by the user device at the geolocation that is depicted in the image data. In some instances, other types of metadata may be additionally, or alternatively, placed in the certificate by the location service. For instance, the user device may provide a fingerprint of the user, a digital fingerprint or device identifier (ID) of the user device, and/or other information or metadata that is to be included in the certificate.

In some examples, the location service may receive requests from users to track the geolocations of a user device over a period of time. In such examples, the location service may periodically, or continuously, receive and/or determine geolocation data indicating different geolocations of the user device during the period of time. The location service may provide the tracked geolocations to requesting users in various ways, such as a plot of a map of the area in which the user device moved. The tracked geolocations and associated times (or timestamps) may be placed in one or more certificates. That is, the tracked geolocations and associated times may be provided in a single signed certificate, or multiple signed certificates.

Once the requested certificate(s) are generated and populated with the appropriate information (e.g., geolocation(s), associated time(s), optional metadata, etc.), the location service may sign the certificate(s) with a private key to create a digitally signed certificate. The service provider that manages the location service may additionally own and/or manage a certificate authority (CA), or work in conjunction with a CA, in order to sign and issue digitally signed certificates. Once the certificate(s) are signed with the private key, users or third-party entities that are presented the digitally signed certificate can verify that the signed certificates have not been modified since they were issued and, using a public key, that the information in the signed certificates is trustworthy based on their trust in the service provider (e.g., TSP).

There are various mechanisms through which users may interact with the location service to request and obtain signed certificates. For instance, the users may download an application provided by the location service onto their user devices through which the users may submit requests to the location service, and/or receive signed certificates attesting to geolocations of their (or other user's) user devices. The signed certificates may then be sent to the user device and accessible for viewing, sharing, and/or downloading at the user device. As another example, the location service may provide an Application Programming Interface (API) that is accessible to allowed entities. As a specific example, a municipal court may desire to monitor people who have been given bail by the court, but who are not allowed to leave the city. In that case, the municipal court may be given access to APIs that provide periodic or continuous assertions of geolocations of the people being tracked at different times to ensure compliance. As another example, a third-party courier may deliver goods to customers, and may subscribe to these APIs for their vehicles and use signed geolocation certificates to ensure a trustful method for proving that the company did attempt to deliver goods that were not successfully delivered to a customer.

This application describes techniques that are rooted in computing technology to overcome problems arising in computing technology. As noted above, geolocations computed locally on client devices using GPS cannot be relied upon by third parties as trustworthy assertions of geolocations of the user devices. However, according to the techniques described herein, geolocations of devices can be determined and asserted as authentic by components within the network of service providers, rather than by the device itself, in order to enable various use cases that were not previously possible. Accordingly, the techniques described herein improve upon existing techniques for localization of computing devices. While the techniques described herein are with respect to signing certificates, the data may be placed in a data structure or data file that can be signed using a private key. Also, while the techniques are described with respect to user devices, the techniques are applicable for any communication devices that can move to different geographic locations.

While the techniques described herein are applicable for various types of networks, technologies, protocols, etc., some implementations may require a precise enough level of positioning information that the location service is part of a 5G network, rather than an earlier generation of cellular network. For example, unlike 4G, 5G operates through MIMO (Multi-user Multiple Input Multiple Output) antennas, which provide precise orientation of the signal in one specific direction, instead of a multidirectional broadcast as provided by 4G antennas. Such MIMO antennas generate narrower radio beams which allow for more precise positioning than in earlier generations of cellular networks, for example using time of flight and angular resolution. 5G mmWave networks can offer comparable coverage to 4G networks if the 5G radio access nodes are deployed at a range of around 100 meters to 200 meters apart, which can be around double the density of 4G antenna deployments. Density of antenna deployment may be increased in some urban areas to accommodate a larger number of connected devices. With some moderate densities of deployments, the 5G network can be capable of achieving a positioning accuracy of 10 meters or below: Inside buildings (e.g., using private 5G networks, also referred to as standalone 5G networks) and in dense urban areas, the 5G network can be capable of achieving a positioning accuracy of 1 meter or below.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 provides a location service 104 that determines geolocations of user devices 106 at different times, signs certificates that include the geolocations and times, and provides the signed certificates to various entities to attest that the devices 106 were at particular geolocations at particular times.

The service provider network 102 may be operated and/or managed by a service provider and may provide various services to users, including the location service 104. For instance, the location service 104 may be offered alongside a suite of cloud-based services that are provided by the service provider. Generally, users may operate user devices 106 in order to register for use of the services of the service provider network 102. The service provider network 102 may provide the location service 104, but in some examples, the location service 104 may be offered by a different entity or organization.

The location service 104 may be provided by, or managed by, the service provider that acts as a Trust Service Provider (TSP) of digital certificates that attest to the truthfulness of user devices 106 being at geolocations at specified times. The service provider may offer additional services as well, including cloud-based services that may support the location service. As described herein, the location service may be a computing device, or a system of computing devices, that include and execute components configured to perform the operations described herein for attesting to geolocations of user devices. The location service 104 may be either centralized, or distributed, and be supported by one or more computing devices. Additionally, the location service 104 may monitor or determine the geolocation of user devices 106 that have registered for, or opted in for use of, the location service 104.

At "1A," a user of a user device 106 may send a request to the location service 104 for a geolocation of their respective user device 106. Additionally, or alternatively, at "1B" a third-party entity 112 may send a request to the location service 104 for a geolocation of the user device 106. In some instances, the request(s) sent may be for one geolocation at a particular time, but it also could be request(s) for the location service 104 to track the user device 106 over a period of time. The request(s) may be submitted to the location service 104 via various techniques such as API request(s), request(s) submitted via applications running on the devices, and so forth.

Generally, the user devices 106 may be any kind of device that can be mobile and communicate over one or more telecommunication networks 108 and/or any other networks (e.g., WANs, PANS, LANs, etc.). The user devices 106 may comprise any type of computing device such as mobile phones, tablets, laptop computers, desktop computers, televisions, servers, and/or any other type of computing device. The telecommunications network(s) 108 may be a cellular network, or mobile network, such as a 5G cellular network, a 4G cellular network, a 4G LTE cellular network, and so forth. User devices 106 generally send signals to radio towers 110 and/or other network devices in telecommunications network 108 by pinging devices in the network infrastructure to determine their location, or simply by communicating over the network infrastructure (e.g., phone calls, text messages, etc.). There are many techniques used by the telecommunications network 108 to determine geographic locations or positions of the user devices 106 relative to the radio towers 110 and/or other network devices, such as using RSSIs or other power measurements for communicated signals, RTT or latency of signals, DOA measurements for signals, beamforming techniques, triangulation techniques and/or various other techniques. To determine locations of user devices 106, the user devices 106 are generally needed to communicate signals with devices in the telecommunications network 108 infrastructure, but the actual calculating or determining of the geolocations for user devices is performed by devices of the telecommunications network 108 and/or the location service 104 (and/or control plane systems).

To determine geolocations of the user device 106, the location service 104 may, at "2," receive network data (and/or geolocation data) from the telecommunications network 108. In some instances, the telecommunications networks 108 may be owned, managed, and/or operated by a same service provider as the location service 104. However, the telecommunications network 108 may be owned, managed, and/or operated by a different service provider that provides the data or information to the location service 104. Depending on the use case, the location service 104 may periodically, continuously, or on an on-demand basis, obtain network data and/or geolocation data from the telecommunications network 108. In some examples, the location service 104 may simply receive geolocation data indicating a geolocation of a user device 106 that as already calculated by the telecommunications network 108 (e.g., longitudinal/latitudinal coordinates, physical addresses, etc.). Additionally, or alternatively, the telecommunications network 108 may provide the location service 104 with the raw network data that the location service 104 can then use to calculate or determine geolocations of user devices.

In such examples, at "3," the location service 104 may calculate the geolocation of the user device 106 using the network data. The network data may include various information, such as RTT or latency measurements of signals, power measurements (e.g., RSSIs), DOA measurements, locations of networking infrastructure, and/or other information usable to calculate the geolocations of user devices 106 connected to a telecommunication network 108.

In some instances, rather than receiving raw network data at "2" and calculating the geolocation at "3," the location service 104 may receive geolocation data from the telecommunications network 108 that already indicates the geolocation of the user device 106. That is, the telecommunications network 108 may calculate the geolocation of the user device 106 using the network data and provide the geolocation to the location service 104. In some examples, the telecommunications network 108 may provide the location service 104 with geolocations in real-time or near real-time such that the location service 104 may timestamp the geolocations and be confident that the timestamp is indicative of the exact or approximate time the user device 106 was at the geolocation.

In some instances, the location service 104 may continuously, or periodically, obtain geographic data for the user devices 106 indicating their geolocations, timestamp the geolocations, and store the geolocation data and timestamps in one or more databases of the service provider network. Then, if a user or third-party requests a signed certificate for a past geolocation, the location service 104 may obtain the requested geolocation(s) and timestamp(s), produce a signed certificate, and provide the signed certificate to the requesting user.

At "4," the location service 104 may generate a certificate 114 and populate the certificate (or any piece of electronic data, such as a file) with an indication of the geolocation of the user device 106, and optionally the time at which the user device 106 was at the geolocation. In some examples, the location service 104 may populate the certificate 114 with various other information, such as image data associated with an image, video, and/or picture provided by the user device 106 that was generated by a camera associated with the user device 106 at the geolocation. For instance, a user of the user device 106 may desire that an image, video, and/or picture created using their user device 106 is included in a digitally signed certificate 114 to prove that the image data was in fact generated by the user device 106 at the geolocation that is depicted in the image data. In some instances, other types of metadata may be additionally, or alternatively, placed in the certificate 114 by the location service 104. For instance, the user device 106 may provide a fingerprint of the user, a digital fingerprint or ID of the user device 106, and/or other information or metadata that is to be included in the certificate 114.

In some examples, the location service 104 may receive requests from users to track the geolocations of a user device 106 over a period of time. In such examples, the location service 104 may periodically, or continuously, receive and/or determine geolocation data indicating different geolocations of the user device 106 during the period of time. The location service 104 may provide the tracked geolocations to requesting users in various ways, such as a plot of a map of the area in which the user device 106 moved. The tracked geolocations and associated times (or timestamps) may be placed in one or more certificates 114.

Once the requested certificate(s) 114 are generated and populated with the appropriate information (e.g., geolocation(s), associated time(s), optional metadata, etc.), the location service 104 may, at "5," may sign the certificate 114 with a private key 116 to create a digitally signed certificate 118. The service provider that manages the location service 104 may additionally own and/or manage a certificate authority (CA), or work in conjunction with a CA, in order to sign and issue digitally signed certificates 118. Once the certificate(s) 114 are signed with the private key 116, the location service 104 may provide the user or third-party entity 112 with access to the digitally signed certificate 118 and the users/entities can verify that the signed certificate 118 have not been modified since they were issued and, using a public key, that the information in the signed certificates is trustworthy based on their trust in the service provider.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable virtual computing resources that can be programmatically provisioned and released in response to user commands. These virtual computing resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The service provider network 102 may include or be a cloud provider network formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs can be considered as the primary backbone locations linking users to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

By using the service provider network, instead of buying, owning, and maintaining their own data centers and servers, organizations can acquire technology such as compute power, storage, databases, and other services on an as-needed basis. The service provider network 102 can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

Generally, the location service 104 may be a scalable service that can spin up or down instances to accommodate demand from users of the location service 104. In some instances, the location service 104 may be hosted on or otherwise associated with a cloud provider network. However, in some examples the location service 104 may be owned, managed, and/or operated by a provider of the telecommunications network 108. In various examples, the service provider network 102 may provide at least one telecommunications network 108 as a service as well.

Figure 2:
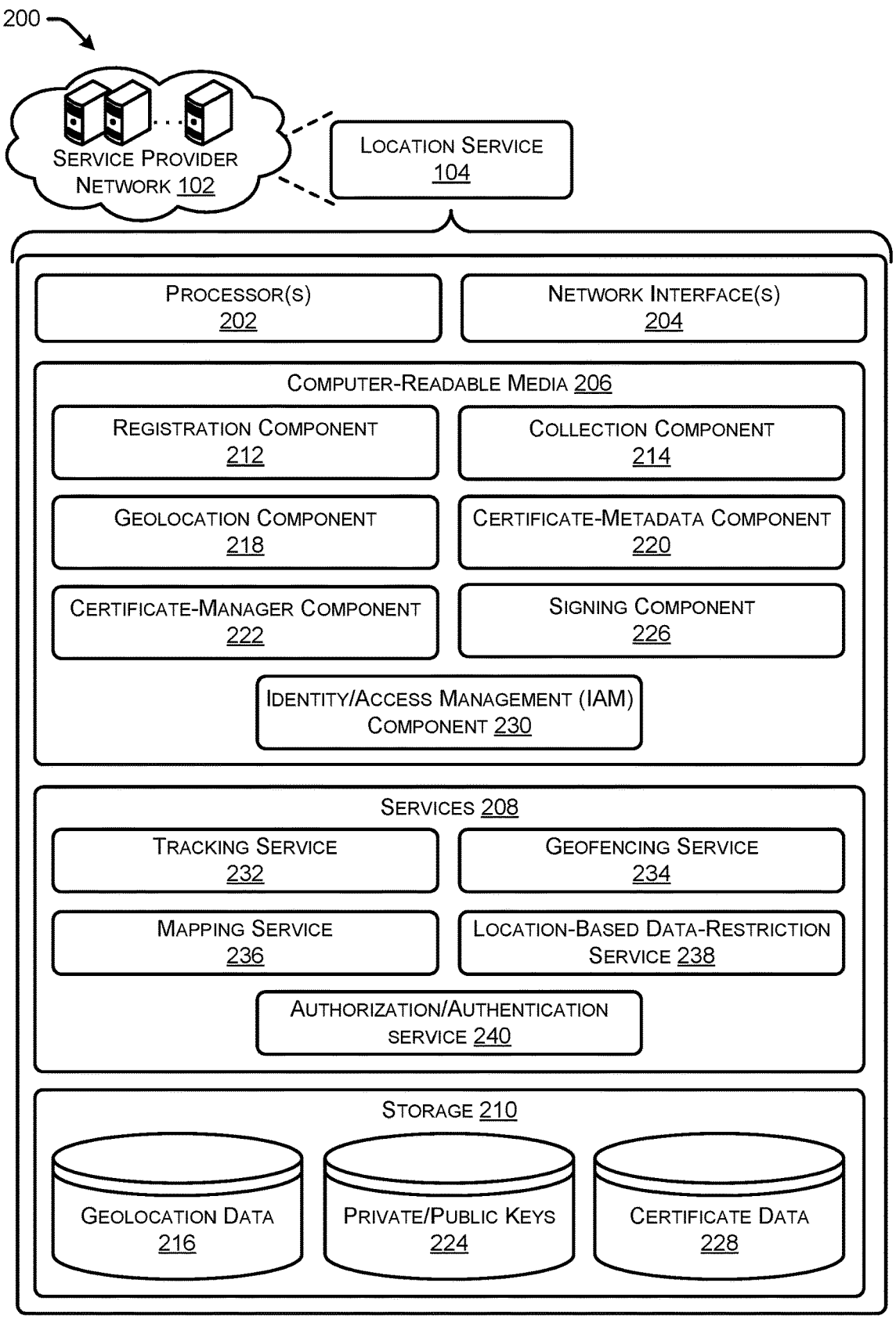
FIG. 2 illustrates a component diagram of an example location service that provides digitally signed certificates that attest to user devices being at particular geolocations at particular times.

FIG. 2 illustrates a component diagram of an example location service 102 that provides digitally signed certificates 118 that attest to user devices 106 being at particular geolocations at particular times.

As illustrated, the location service 102 may include one or more hardware processors 202 (processors), one or more devices, configured to execute one or more stored instructions. The processor(s) 202 may comprise one or more cores. Further, the location service 102 may include one or more network interfaces 204 configured to provide communications between the location service 102 and other devices, such as the user device(s) 106, third-party entities 112 with computing devices, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth.

The location service 102 may also include computer-readable media 206 that is used to execute various executable components (e.g., software-based components, firmware-based components, etc.). The computer-readable-media 206 may further execute components to implement functionality described herein. While not illustrated, the computer-readable media 206 may store one or more operating systems utilized to control the operation of the one or more devices that comprise the location service 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

The location service 102 may further include and/or interact with various services 208 with which users may interact and send requests for operations to be performed. Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media (CRM) 206 may store portions, or components, of the location service 104 described herein. For instance, the computer-readable media 206 may store code that is included in the location service 104 and is supported by computing devices of the location service 104. As shown, the computer-readable media 206 may store a registration component 212 that tracks what users and/or third-party entities 112 have opted in to use various services of the location service 104. In some instances, the location service 104 may only be utilized for users that have registered for use of the location service 104 with the registration component 212.

The CRM 206 may further include and/or help execute a collection component 214 that collects network data and/or geographic data 216 from telecommunications networks 108. For instance, the collection component 214 may periodically, continuously, or on an on-demand basis, obtain network data and/or geolocation data 216 from the telecommunications network 108. In some examples, the collection component 214 may simply receive geolocation data 216 indicating a geolocation of a user device 106 that as already calculated by the telecommunications network 108 (e.g., longitudinal/latitudinal coordinates, physical addresses, etc.). Additionally, or alternatively, the telecommunications network 108 may provide the collection component 214 with the raw network data that a geolocation component 218 can then use to calculate or determine geolocations of user devices 106. The network data may include various information, such as RTT or latency measurements of signals, power measurements (e.g., RSSIs), DOA measurements, locations of networking infrastructure, and/or other information usable to calculate the geolocations of user devices 106 connected to a telecommunications network 108.

The geolocation component 218 may be configured to determine geolocation data 216 indicating geolocations of user devices 106. The geolocation component 218 may be configured to perform various techniques that are known in the art for localizing, or positioning, user devices 106 connected to telecommunications networks 108.

The CRM 206 may further store and/or help execute a certificate-metadata component 220 that obtains additional metadata, or certificate data 228, to be included in certificates 114. The certificate data 228 may include data such as image data (e.g., pictures, images, videos, etc.), fingerprints of users, device IDs or device fingerprints of user devices 106, and/or any other data.

The CRM 206 may further store to help execute a certificate-manager component 222. The certificate-manager component 222 may perform various operations traditionally performed by a certificate authority. For instance, the certificate-manager component 222 may manage private/public key 224 pairings. The certificate-manager component 222 may act as the component that, along with the signing component 226, helps issue digital geolocation certificates (e.g., signed certificates 118 asserting a geolocation of a device 106). The certificate-manager component 222 may act as a trusted third party with respect to the user devices 106 and third-party entities 112.

The services 208 may include a tracking service 232 by which users and/or third-party entities 112 may track geolocations of user devices 106 indicated in signed certificates 118, and a geofencing service 234 that may be used to determine whether user devices 106 are within or outside of predefined geolocations as indicated in signed certificates 118 (e.g., parole leaving city limits). Further, the services 208 may include a mapping service 236 that can provide instructions and/or directions to users, and a location-based data-restriction service 238 that may restrict or allow access to various data or resources based on a user device 106 being within or outside of a defined geographic area based on geolocations indicated in signed certificates 118.

To utilize the services 208 provided by the location service 104, users may register for an account with the location service 104. For instance, users may utilize a user device 106 to interact with an identity and access management (IAM) component 230 that allows the users to create user accounts with the location service 104. Generally, the IAM component 230 may enable the users to manage their preferences and services using their respective accounts.

In some instances, the services provided by the service provider network 102 and/or location service 104 may include an authorization/authentication service 240 that may utilize the signed certificates 118 described herein. Authorization/authentication services may use geolocation as a factor for authenticating or authorizing a user to utilize services or access data. However, these authorization/authentication service 240 may be hesitant to use geolocation as a factor for authn/authz due to the ability of being spoofed by user devices 106. Accordingly, the authorization/authentication service 240 may require that users of user devices 106 provide signed certificates 118 described herein when attempting to authenticate themselves, gain authorization for various privileges, perform step-up authentications, and so forth. In one example, a user of a user device 106 may utilize a hardware authentication device as a means to authenticate themselves and/or gain authorizations. The hardware authentication device may support one-time passwords, public-key cryptography, and various hardware-authentication protocols. In some instances, the authorization/authentication service 240 may require that, when authenticating using the hardware authentication device, the user device 106 also provide an indication of their geolocation using a signed certificate 118 as described herein. In this way, the geolocation of the user device may be confidently used in conjunction with the hardware authentication device for multi-factor authentication and/or step-up authentication.

The computer-readable media 206 may be used to store and retrieve information, such as program modules, data structures, or other data. It should be appreciated by those skilled in the art that computer-readable storage media is any available media that provides for the non-transitory storage of data and that can be accessed by the location service 104. In some examples, the operations performed by the location service 104, and or any components included therein, may be supported by one or more server devices. Stated otherwise, some or all of the operations performed by the location service 104, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3A:
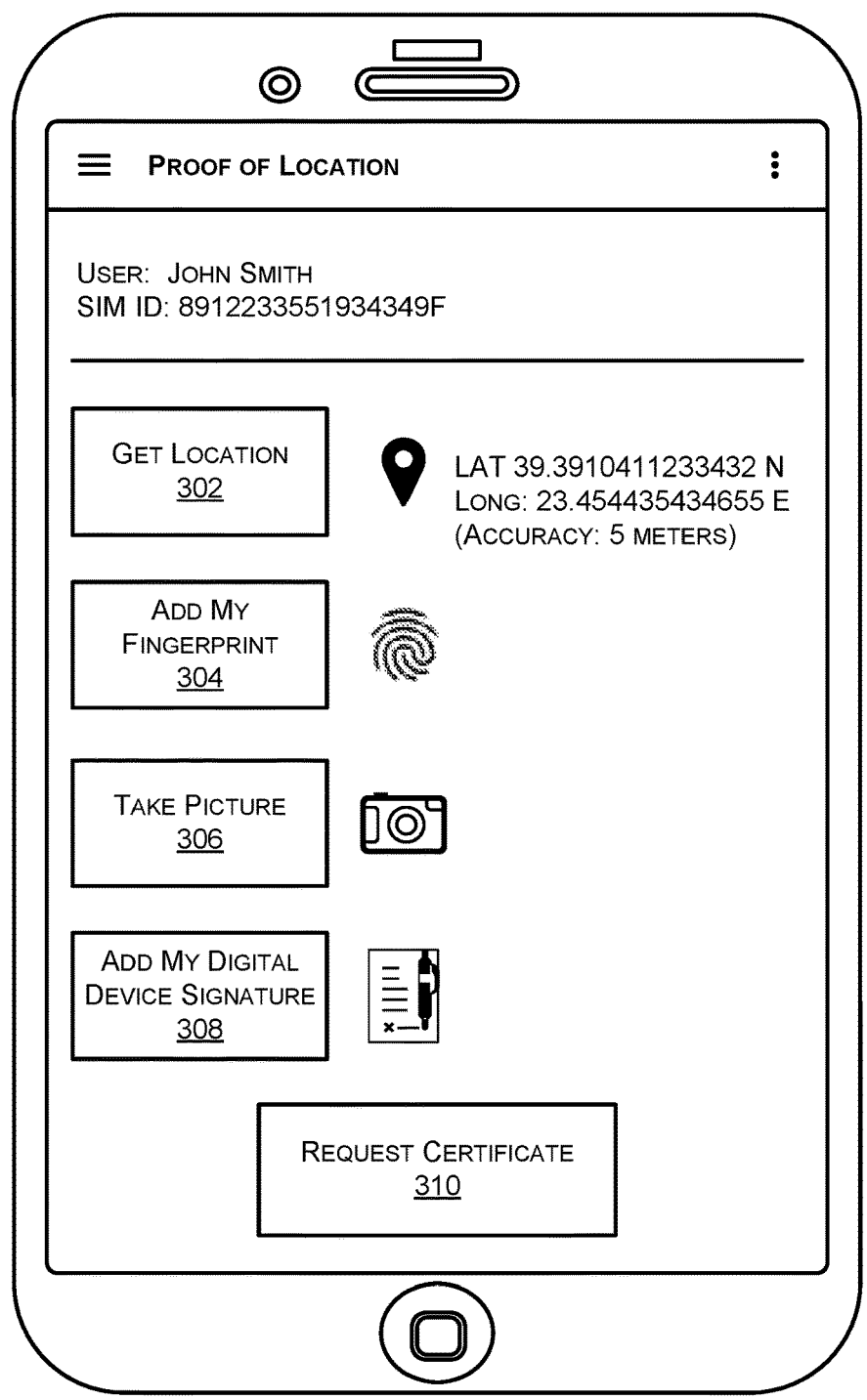
FIG. 3A illustrates an example user interface of an application through which users of user devices may request signed certificates that attest to geolocations of user devices.

FIG. 3A illustrates an example user interface 300 of an application through which users of user devices 106 may request signed certificates 118 that attest to geolocations of user devices 106.

As illustrated, the example interface 300 may be presented on a user device 106 and include an option to get a location 302 of the user device 106. The location may be expressed in latitudinal and longitudinal coordinates, in physical street addresses, and/or any other technique for expression geolocations. The interface 300 may further include an add-my-fingerprint option 304 that allows a user of a user device 106 to have their fingerprint included in the signed certificate 118. In this way, third-party entities 112 may be able to determine that the actual user was with the user device 106 at the geolocation/time indicated by the signed certificate 118. The interface 300 may also include a take picture option 306 where a user can take a picture/video of the environment at the geolocation and have the picture/image/video be included in the signed certificate 118. Even further, the interface 300 may include an add-my-digital-device signature option 308 that allows users to include their device ID/signature to the signed certificate 118. Once the user has selected the options they would like to use for managing their signed certificate 118, the user may select a request certificate option 310 which sends a request to the location service 104 for a signed certificate 118.

Figure 3B:
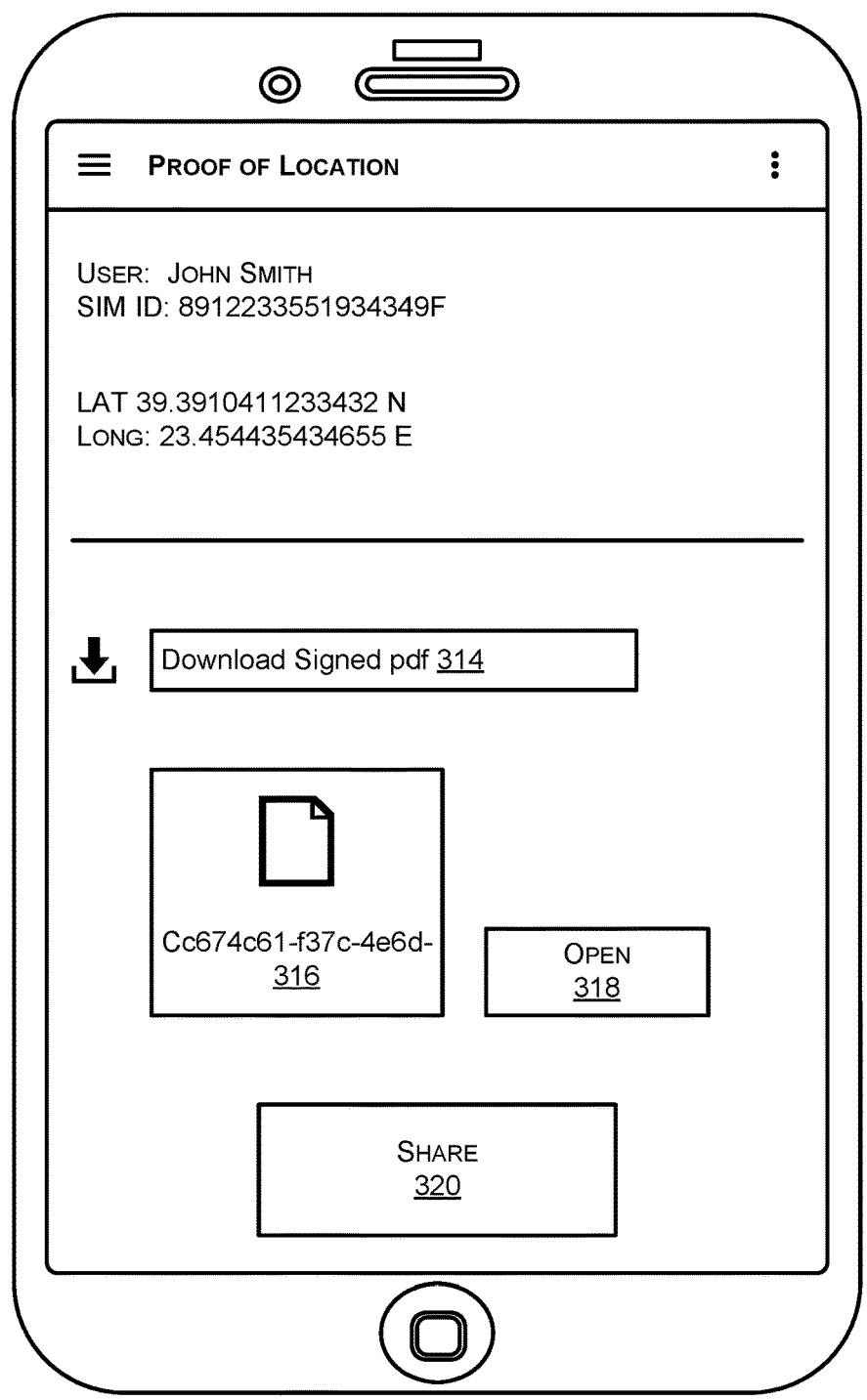
FIG. 3B illustrates an example user interface of an application through which users of user devices may download, view, and/or share digitally signed certificates that attest to geolocations of user devices.

FIG. 3B illustrates an example user interface 312 of an application through which users of user devices 106 may download, view, and/or share digitally signed certificates 118 that attest to geolocations of user devices 106.

The user interface 312 may include an option for a user to download a signed Portable Document Format (PDF) file (e.g., a signed certificate 118). By selecting this option, the user 106 can store a signed certificate 118 locally on their user device 106. Further, the user interface 312 may further include the downloaded signed certificate 316 icon, as well as an option to open and view 318 the signed certificate 118. Further, the user interface 312 may include an option to share 320 the signed certificate 118. The share option 320 may provide the user of the user device 106 with various avenues for sharing the signed certificate 118, such as a text message, an email, social media, a short-range communication protocol exchange, etc.

FIG. 4 illustrates an example of a signed digital certificate 118 that includes and attests to a geolocation of a user device 106, a time at which the user device 106 was at the geolocation, user data, and picture data taken at the geolocation.

As shown, there are Quick Response (QR) codes 402 and 404 which can be used by users and/or third-party entities 112 to quickly share the signed certificate 118 with other entities and to validate the signed certificate 118 as being signed by the location service 104. Further, the signed certificate 118 in this example can include a main 406 portion in which an ID of the signed certificate 118 is listed, the attestation that it was signed by the location service 104, the geolocation and time/date on which the user device 106 was at the geolocation, and the physical address and coordinates representing the geolocation.

The signed certificate 118 may further include a user data 408 portion in which information about the user can be included. In some instances, the user data 408 may further include a fingerprint of the user to provide proof that the user was in fact with the user device 106 when the user device 106 was at the geolocation.

The signed certificate 118 may additionally, and optionally, include a picture data 410 portion in which a picture and associated metadata can be included. As shown, the picture data includes a picture taken by the user at the particular time and at the geo location, and may further include metadata associated with the picture (e.g., shooting time, format, etc.).

Figure 5:
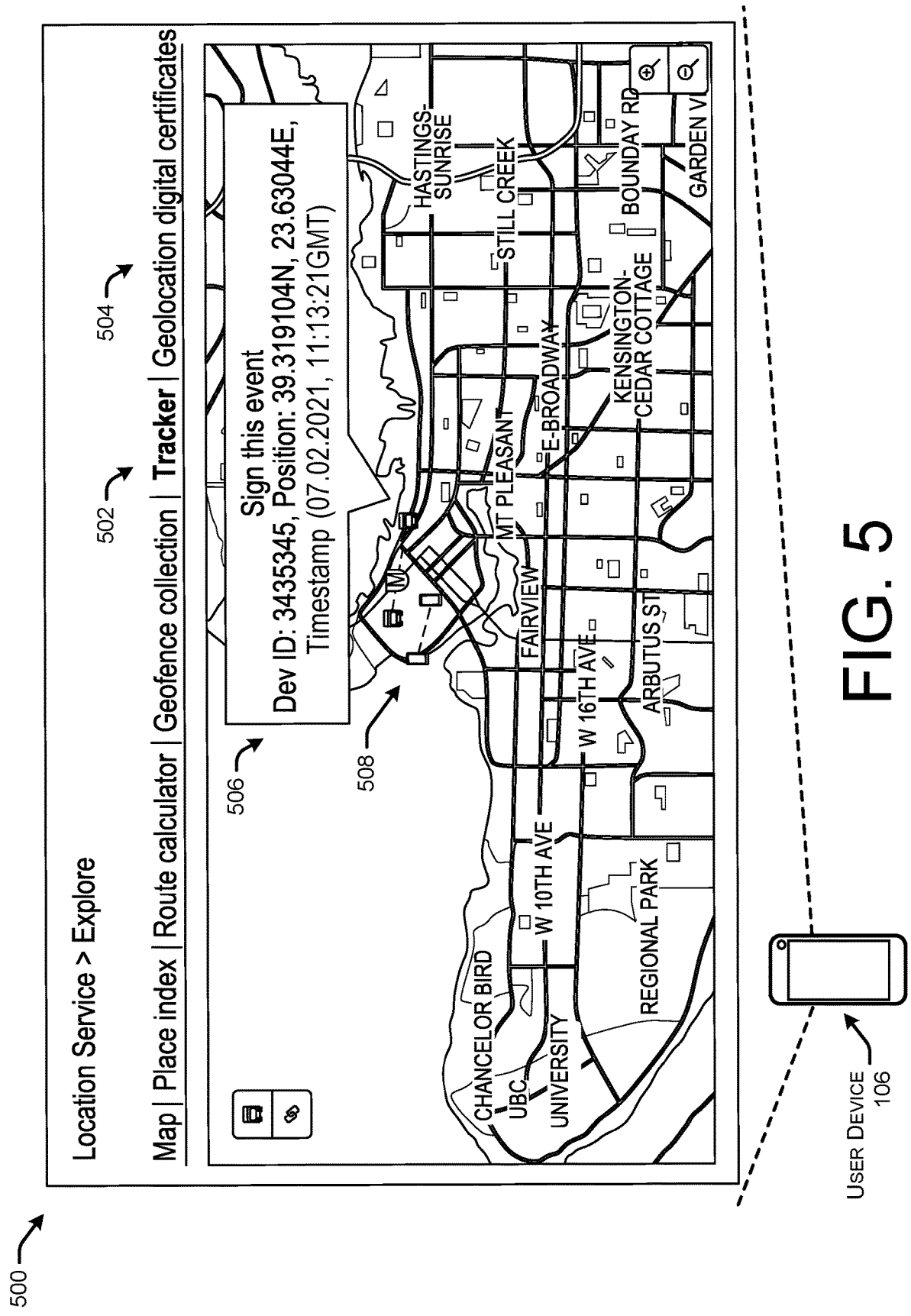
FIG. 5 illustrates an example user interface of an application through which a location service can plot, on a map, tracked geolocations of a user device that can be, and/or have been, attested to by the location service through signed certificates.

FIG. 5 illustrates an example user interface 500 of an application through which the location service 104 can plot, on a map, tracked geolocations of a user device 106 that can be, and/or have been, attested to by the location service 104 through signed certificates 118.

As shown, the user interface 500 may include a tracker option 502 that a user may select to view; on a map, different geolocations at which the user device 106 previously moved through. Additionally, there may be a geolocation-digital certificate option 504 that the user can select in order to request that the location service 104 generate a signed certificate 118. For instance, the user may select a location 508 on their location trace, and then geolocation-digital certificate option 504 to send a request to the location service 104 to generate a signed certificate 118 attesting to the user device 106 being at that geolocation at a specific time 506.

Figure 6:
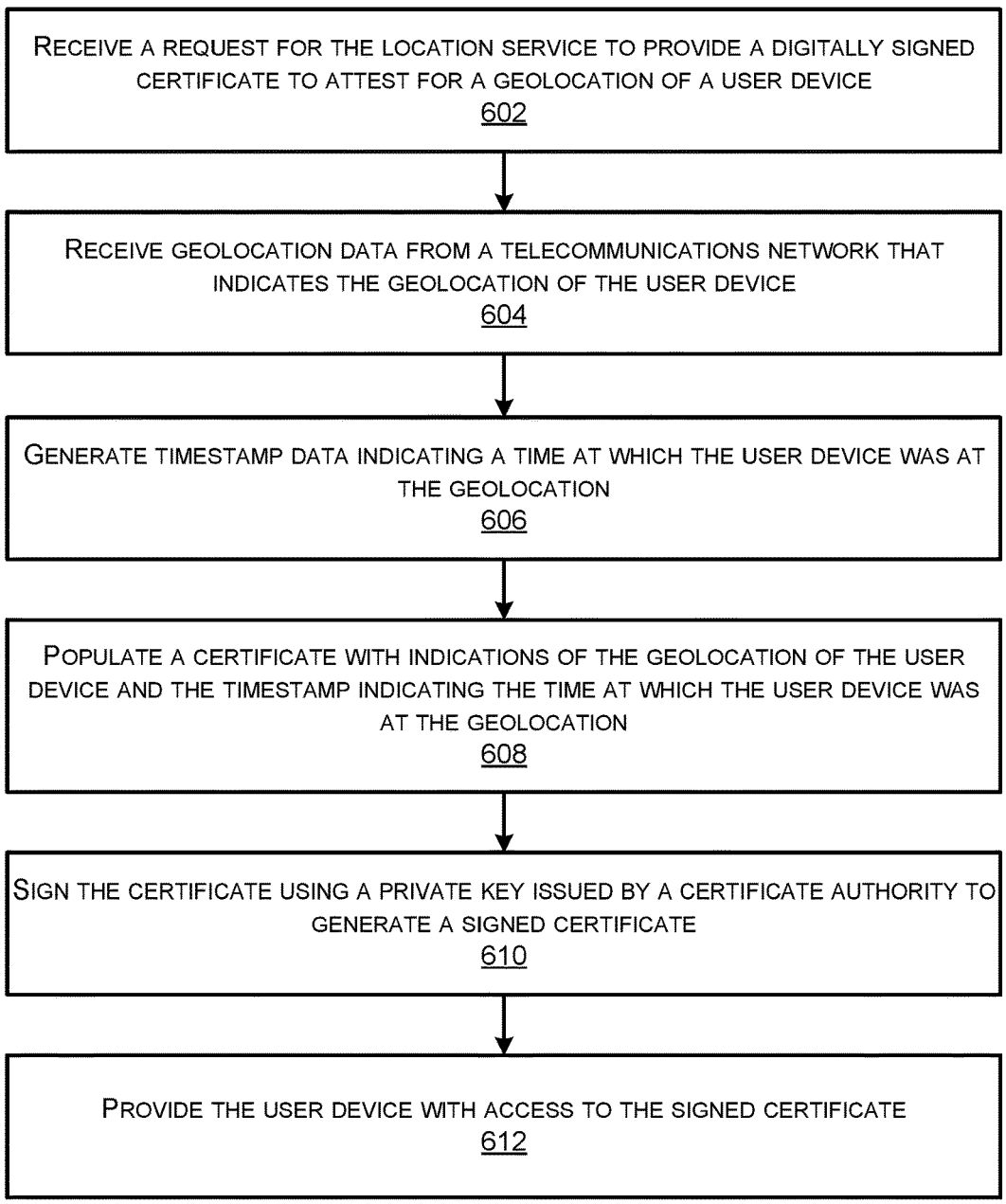
FIG. 6 illustrates a flow diagram of an example method for a location service to receive a request for a digitally signed certificate that attests for a geolocation of a user device, calculates geolocation of the user device, populates a certificate with the geolocation and timestamp, and provides the signed certificate to the user device.
Figure 8:
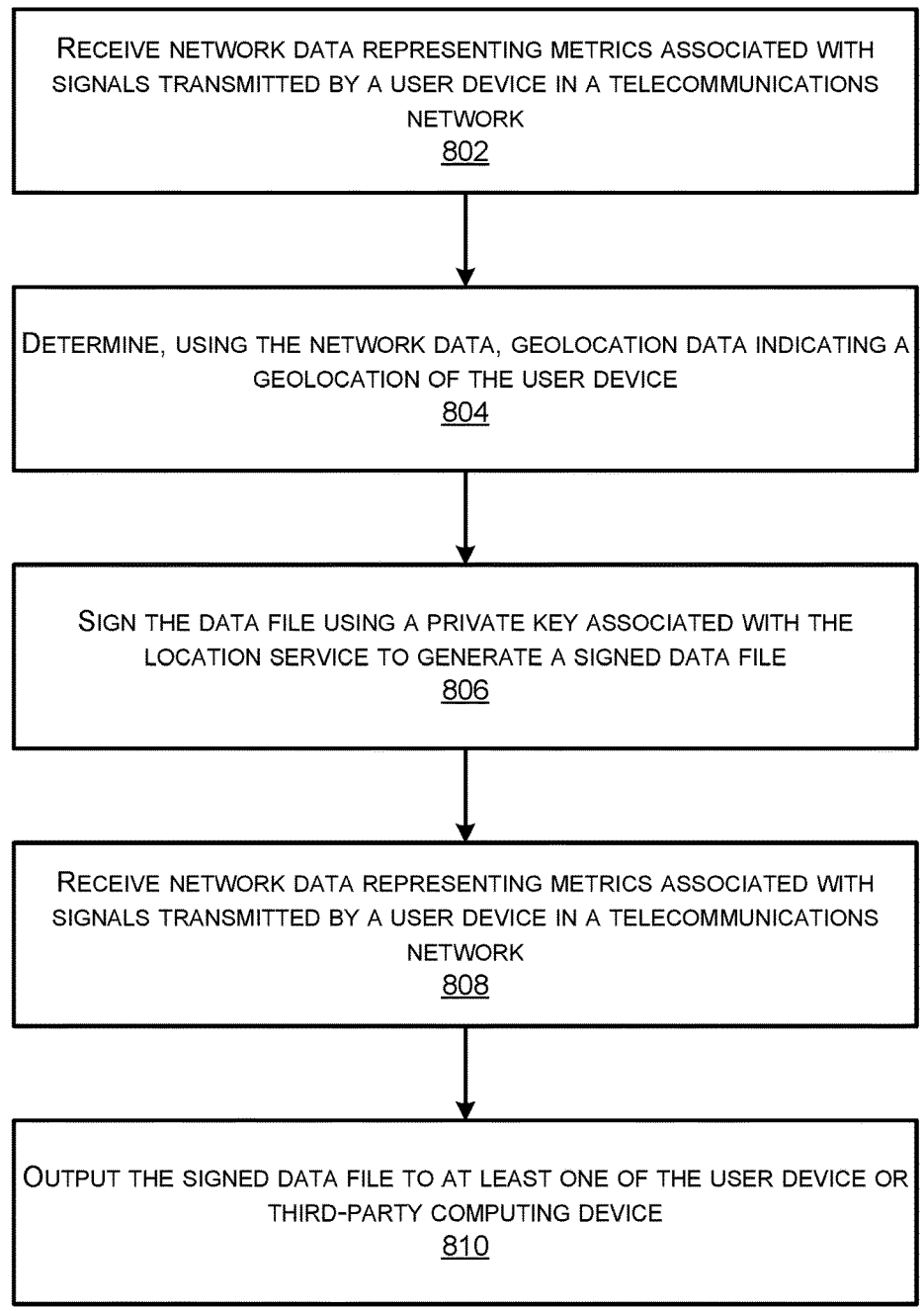
FIG. 8 illustrates a flow diagram of an example method for a location service to receive network data from a telecommunications network, perform calculations using the network data to determine a geolocation of the user device, populate a data file with the geolocation and associated time, sign the certificate, and output the signed certificate.

FIGS. 6-8 illustrate flow diagrams of example methods 600, 700, and 800 that illustrate aspects of the functions performed at least partly by the location service 104 as described in this disclosure. The logical operations described herein with respect to FIGS. 6-8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 6-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The techniques of methods 600, 700, and 800 may be performed, at least partly, by the location service 104 which may include one or more processors and one or more computer-readable media storing computer-executable instructions that, when executed by the one or more processors, cause the one or more processors to perform the operations of the methods.

FIG. 6 illustrates a flow diagram of an example method 600 for a location service 104 to receive a request for a digitally signed certificate that attests for a geolocation of a user device 106, calculates geolocation of the user device 106, populates a certificate 114 with the geolocation and timestamp, and provides the signed certificate 118 to the user device 106. The method 600 may comprise a method to provide digitally signed certificates that attest for geolocations of user devices 106.

At 602, a location service may receive a request to provide a digitally signed certificate to attest for a geolocation of a user device. For instance, a user of the user device 106, and/or a third-party entity 112, may send a request (e.g., via an API, via an application on the device 106, etc.) to the location service 104 to provide a signed certificate 118 to attest for a geolocation of the user device 106.

At 604, the location service may receive geolocation data from a telecommunications network that indicates the geolocation of the user device. For instance, the location service 104 may receive geolocation data such as physical street addresses, coordinates, etc., that indicate the geolocations of user devices 106 connected to a telecommunications network 108.

At 606, the location service may generate timestamp data indicating a time at which the user device was at the geolocation. The telecommunications network 108 may stream the geolocation data in real time, or near real-time, such that timestamps generated by the location service 104 are associated with geolocations of user devices 106.

At 608, the location service may populate a certificate with indications of the geolocation of the user device and the timestamp indicating the time at which the user device was at the geolocation. For instance, the location service 104 may generate and populate a certificate 114 with a physical address, coordinates, and/or other indications of the user device 106 and a timestamp indicating when the user device 106 was at the geolocation.

At 610, the location service may sign the certificate using a private key issued by a certificate authority to generate a signed certificate. For instance, the location service 104 may sign the certificate 114 using a private key 116 to generate a signed certificate 118 that is verifiable by other entities as being signed by the private key 116 association with the location service 104.

At 612, the location service may provide the user device with access to the signed certificate. For instance, the location service 104 may send the signed certificate 118 to the user device 118 via any electronic means, make the signed certificate 118 available for download via an application on the user device 106, allow the user device 106 to call an API to obtain the signed certificate 118, and/or use any other method to provide the user device 106 with access to the signed certificate 118.

FIG. 7 illustrates a flow diagram of an example method 700 for a location service 104 to obtain a geolocation of a user device 106, populate a certificate 114 with the geolocation and associated time, sign the certificate 114, and output the signed certificate 118.

At 702, the location service may obtain geolocation data from a telecommunications network that indicates a geolocation of a user device at a particular time. In some instances, the telecommunications network 108 may calculate the geolocation of the user device 106 and provide the geolocation and timestamp to the location service. In other examples, the location service 104 may receive network data from the telecommunications network 108, and calculate, using the network data, the geolocation data indicating the geolocation of the user device. Further, the location service 104 may determine an accuracy value indicating a measure of accuracy of the geolocation of the user device 106 (e.g., 5 meters, as shown in FIG. 4), and populate the certificate 114 with the accuracy value prior to signing the certificate 114.

At 704, the location service may populate a certificate with indications of the geolocation of the user device and the time at which the user device was at the geolocation. For instance, the location service 104 may generate and populate a certificate 114 with a physical address, coordinates, and/or other indications of the user device 106 and a timestamp indicating when the user device 106 was at the geolocation.

At 706, the location service may sign the certificate using a private key associated with the location service to generate a signed certificate. For instance, the location service 104 may sign the certificate 114 using a private key 116 to generate a signed certificate 118 that is verifiable by other entities as being signed by the private key 116 association with the location service 104.

At 708, the location service may output the signed certificate to the user device or another computing device. For instance, the location service 104 may send the signed certificate 118 to the user device 118 (and/or third-party entity 112) via any electronic means, make the signed certificate 118 available for download via an application on the user device 106 (and/or third-party entity 112), allow the user device 106 (and/or third-party entity 112) to call an API to obtain the signed certificate 118, and/or use any other method to provide the user device 106 with access to the signed certificate 118.

FIG. 8 illustrates a flow diagram of an example method 800 for a location service 104 to receive network data from a telecommunications network 108, perform calculations using the network data to determine a geolocation of the user device 106, populate a data file with the geolocation and associated time, sign the certificate, and output the signed certificate.

At 802, the location service may receive network data from a telecommunications network that represents metrics associated with signals transmitted by a user device in a telecommunications network. For instance, the location service 104 may receive network data such as RTT or latency measurements of signals, power measurements (e.g., RSSIs), DOA measurements, locations of networking infrastructure, and/or other information usable to calculate the geolocations of user devices 106 connected to a telecommunications network 108.

At 804, the location service may determine, using the network data, geolocation data indicating a geolocation of the user device. For instance, the location service 104 may utilize techniques for positioning and/or localization of communication devices to determine the geolocation.

At 806, the location service may populate a data file with indications of the geolocation of the user device and a time at which the user device was at the geolocation. The data file may be any type of data file, including but not limited to a certificate.

At 808, the location service may sign the data file using a private key associated with the location service to generate a signed data file. For instance, the location service 104 may sign the data file using a private key 116 to generate a signed certificate 118 that is verifiable by other entities as being signed by the private key 116 association with the location service 104.

At 810, the location service may output the signed data file to at least one of the user device or third-party computing device. For instance, the location service 104 may send the signed certificate 118 to the user device 118 (and/or third-party entity 112) via any electronic means, make the signed certificate 118 available for download via an application on the user device 106 (and/or third-party entity 112), allow the user device 106 (and/or third-party entity 112) to call an API to obtain the signed certificate 118, and/or use any other method to provide the user device 106 with access to the signed certificate 118.

Figure 9:
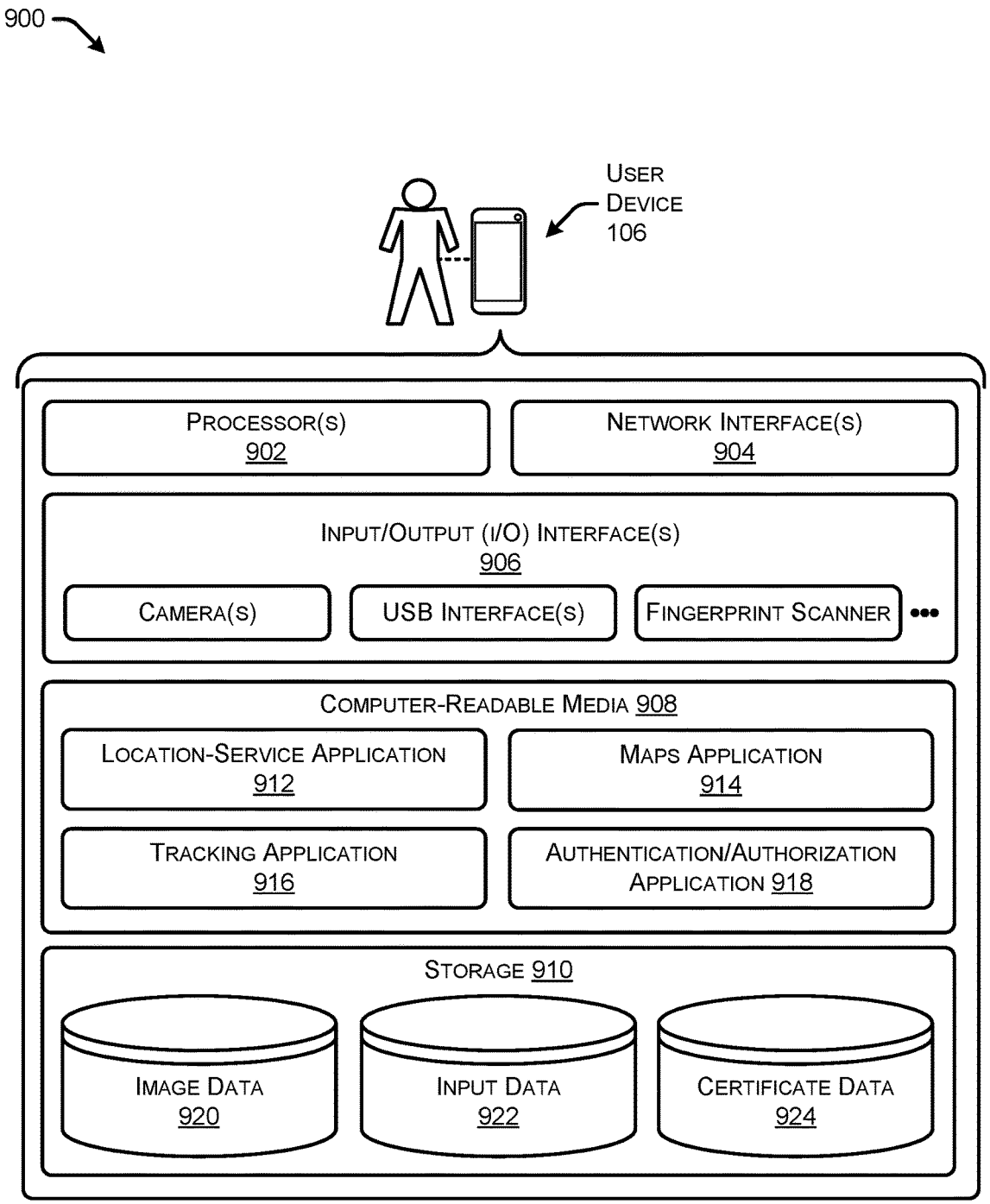
FIG. 9 illustrates a component diagram of an example user device that may request digitally signed certificates from a location service where the digitally signed certificates attest to the user device being at particular geolocations at particular times.

FIG. 9 illustrates a component diagram of an example user device that may request digitally signed certificates from a location service where the digitally signed certificates attest to the user device being at particular geolocations at particular times.

As illustrated, the user device 106 may include one or more hardware processors 902 (processors), one or more devices, configured to execute one or more stored instructions. The processor(s) 902 may comprise one or more cores. Further, the user device 106 may include one or more network interfaces 904 configured to provide communications between the user device 106 and other devices, such as the location service 104, third-party entities 112 with computing devices, and/or other systems or devices in the service provider network 102 and/or remote from the user device 106. The network interfaces 904 may include devices configured to couple to personal area networks (PANs), wired and wireless local area networks (LANs), wired and wireless wide area networks (WANs), and so forth.

The user device 106 may also include computer-readable media 206 that is used to execute various executable components (e.g., software-based components, firmware-based components, etc.). The computer-readable-media 206 may further execute components to implement functionality described herein. While not illustrated, the computer-readable media 206 may store one or more operating systems utilized to control the operation of the one or more devices that comprise the user device 106. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

The use device may include one or more input/output (I/O) interfaces 906, such as a camera, a Universal Serial Bus Interface, a fingerprint scanner, and so forth. Additional I/O devices 906 may include (although not illustrated) a mouse, keyboard, one or more displays (e.g., touch screen, Liquid-crystal Display (LCD), Light-emitting Diode (LED) display, organic LED display, plasma display, electronic paper display, etc.), one or more sensors (e.g., accelerometer, magnetometer, etc.), one or more lights, one or more microphones, one or more speakers, and so on.

The CRM 908 may include a location-service application 912 configured to interact with the location service 104 and perform operations described herein as being performed via the user device 106. The location-service application 912 may cause various GUIs to be presented as described herein, such as those described with reference to FIGS. 3A, 3B, 4, and 5. Further, the location-service application 912 may receive input from, and provide output to, a user of the user device 106. The location-service application 912 may enable the user of the user device 106 to request and receive signed certificates 118 as described herein. The CRM 908 may further include a maps application 914 and a tracking application 916 that enable the user of the user device 106 to be provided with mapping services (e.g., directions, find-my-device applications, track my route, etc.) and other services described herein.

The user device 106 may include an authentication/authorization application 918 that enables the user to authenticate and/or authorize with services using geolocation via the signed certificates 118 described herein. For instance, a user can register "approved" geolocations that may be used for authn/authz, MFA, step-up auth, etc. As an example, if a user utilizes a hardware authentication device to interact with the user device 106 to prove who the user is, the authentication/authorization application 918 may additionally send a signed certificate 118 to the authn/authz service to prove that the user device 106 is at an approved location with a high level of confidence.

The storage 910 may include various types of data, such as image data 920 generated by the camera(s) 906 which represent an environment of the user device 106. In some instances, to ensure the image data 920 represent the geolocation at which the user device 106 is currently located, the location-service application 912 may prompt the user to use the camera 906 to take a picture such that the corresponding image data 920 may be provided to the location service 104 to ensure that tampered image data or previously generated image data is not uploaded to the location service 104. In such examples, the location—service application 912 may block access to various storage locations 910 to ensure that tampered—with image data or previously obtained image data 920 cannot be provided to the location service 104. Additionally, the storage 910 may include other input data 922, such as fingerprint data generated using the fingerprint scanner, which may be sent to the location service 104 to be included in a signed certificate 118. Further, the storage 910 may include certificate data 924, such as signed certificates 118, that have been provided to the user devices 106 for use in attesting that the user device 106 was at different geolocations at different times. The signed certificates 118 stored in the storage 910 may be shared from the user device 106 using various mechanisms, such as a text message, an email, social media, a short-range communication protocol exchange, etc.

Figure 10:
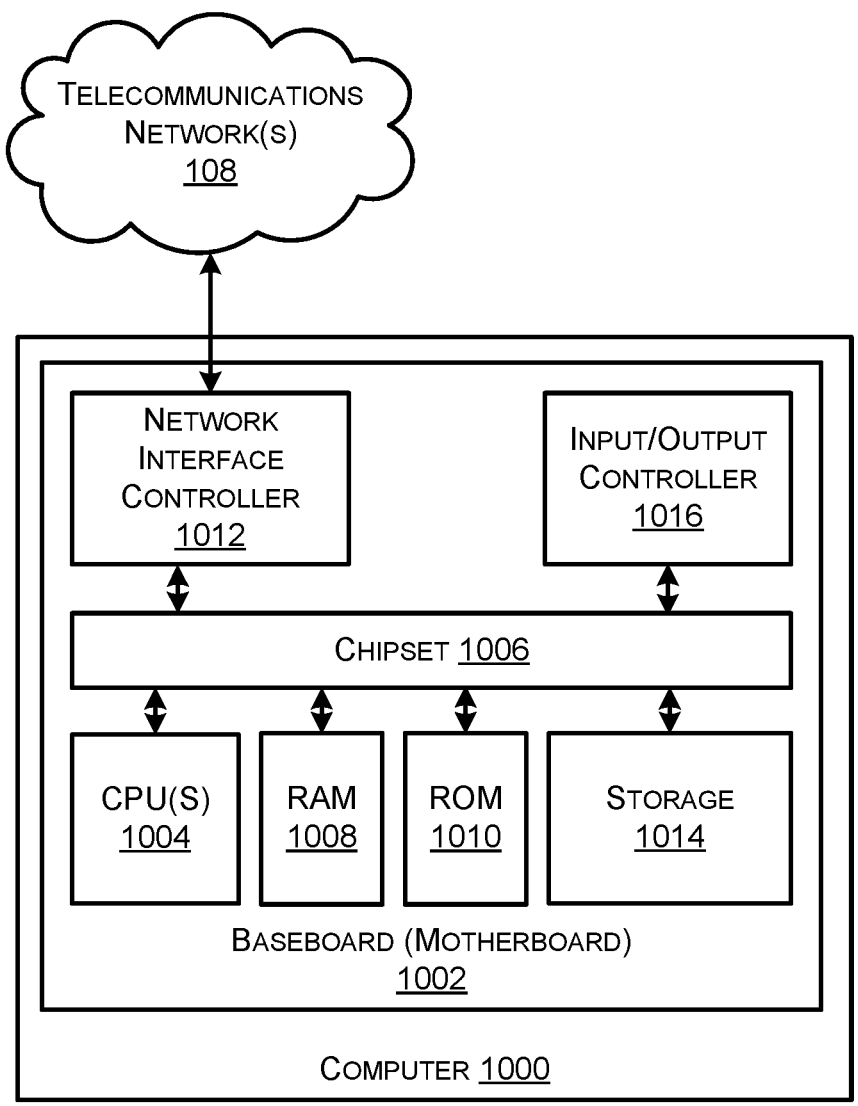
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a computer 1000 that may correspond to, or be the same as or similar to, user device, a third-party entity device, and/or a device included in and supporting the location service 104 described herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 108. The chipset 1006 can include functionality for providing network connectivity through a network interface controller (NIC) 1012, such as a gigabit Ethernet adapter. The NIC 1012 is capable of connecting the computer 1000 to other computing devices over the network 108. It should be appreciated that multiple NICs 1012 can be present in the computer 1000, connecting the computer to other types of networks and remote computer systems.

The computer 1000 can include storage 1014 (e.g., disk) that provides non-volatile storage for the computer. The storage 1014 can consist of one or more physical storage units. The storage 1014 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage 1014 by detecting the physical states or characteristics of one or more particular locations within the physical storage units.

In addition to the storage 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the location service 104, and or any components included therein, may be supported by one or more devices similar to computer 1000. Stated otherwise, some or all of the operations performed by the location service 104, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1014 can store an operating system utilized to control the operation of the computer 1000. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1014 can store other system or application programs and data utilized by the computer 1000.

In one embodiment, the storage 1014, RAM 1008, ROM 1010, and/or other computer-readable storage media may be encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various techniques described above. The computer 1000 can also include computer-readable storage media having instructions stored thereupon for performing any of the other computer-implemented operations described herein.

The computer 1000 can also include one or more virtualized input/output controllers 1016 for receiving and processing input from a number of input devices, such as a virtualized keyboard, a mouse, a touchpad, a touch screen, an electronic stylus, or other type of input device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method performed at least in part by a location service of a telecommunications network to provide digitally signed certificates that attest geolocations of user devices connected to the telecommunications network, comprising:
    receiving a request for the location service to provide a digitally signed certificate to attest a geolocation of a user device;
    receiving, at the location service, geolocation data from the telecommunications network that indicates the geolocation of the user device;
    generating, at the location service, timestamp data indicating a time at which the user device was at the geolocation;
    receiving, from the user device, image data representing an image generated by a camera of the user device while the user device was at the geolocation;
    verifying, using the image data, that the image was taken at the geolocation;
    populating a certificate with indications of the geolocation of the user device, the image data, and the timestamp indicating the time at which the user device was at the geolocation;
    signing the certificate using a private key issued by a certificate authority to generate a signed certificate; and
    providing the user device with access to the signed certificate.

2. The computer-implemented method of claim 1, wherein the request is tracking request for the location service to track geographic locations of the user device for a period of time, further comprising:
    obtaining additional geolocation data indicating a plurality of geolocations of the user device at different times during the period of time;
    generating additional timestamp data indicating different times at which the user device was at the plurality of geolocations; and
    populating at least one of the certificate or one or more additional certificates with additional indications of the plurality of geolocations of the user device and the different times at which the user device was at the plurality of geolocations.

3. The computer-implemented method of claim 1, further comprising:
    receiving, from the user device, at least one of a digital fingerprint associated with the user device or a fingerprint associated with user of the user device; and
    populating the certificate with the at least one of the digital fingerprint or the fingerprint prior to signing the certificate.

4. A system comprising:
one or more processors; and
one or more computer-readable media storing computer-executable instructions that, when executed by the one or more processors, cause the one or more processors to perform operations comprising:
obtaining, at a location service, geolocation data from a telecommunications network that indicates a geolocation of a user device at a particular time,
wherein:
the location service is provided by a trusted service provider and the telecommunications network is a fifth-generation (5G) cellular network managed by the trusted service provider; and
obtaining the geolocation data includes:
receiving network data from one or more network devices in the telecommunications network, the network data being associated with communications by the user device in the telecommunications network; and
determining, using the network data, the geolocation data indicating the geolocation of the user device;
populating, at the location service, a certificate with indications of the geolocation of the user device and the time at which the user device was at the geolocation;
signing the certificate using a private key associated with the location service to generate a signed certificate; and
outputting the signed certificate to the user device or another computing device.

5. The system of claim 4, the operations further comprising:
receiving, from the user device, image data representing an image generated by a camera of the user device while the user device was at the geolocation;
verifying, using the image data, that the image was taken at the geolocation; and
populating the certificate with the image data prior to signing the certificate.

6. The system of claim 4, further comprising:
receiving network data from the telecommunications network;
calculating, using the network data, the geolocation data indicating the geolocation of the user device;
determining an accuracy value indicating a measure of accuracy of the geolocation of the user device; and
populating the certificate with the accuracy value prior to signing the certificate.

7. The system of claim 4, further comprising:
receiving a request to track geolocations of the user device over a period of time;
obtaining, from the telecommunications network, additional geolocation data indicating a plurality of geolocations of the user device at different times during the period of time;
receiving timestamp data indicating different times at which the user device was at the plurality of geolocations; and
populating at least one of the certificate or one or more additional certificates with additional indications of the plurality of geolocations of the user device and the different times at which the user device was at the plurality of geolocations.

8. The system of claim 4, the operations further comprising:
receiving, via an application executing on the user device, a request for a digitally signed certificate attesting to an authenticity of an image taken by the user device;
receiving, from the user device, image data representing the image generated by a camera of the user device while the user device was at the geolocation; and
populating the certificate with the image data prior to signing the certificate.

9. The system of claim 4, further comprising:
receiving, from the user device, a digital fingerprint associated with the user device; and
populating the certificate with the digital fingerprint prior to signing the certificate.

10. The system of claim 4, the operations further comprising:
receiving, from the user device, a fingerprint associated with a user of the user device; and
populating the certificate with the fingerprint prior to signing the certificate.

11. A method comprising:
receiving, at a location service, network data representing metrics associated with signals transmitted by a user device in a telecommunications network;
receiving a request to track geolocations of the user device over a period of time;
determining, using the network data, geolocation data indicating a geolocation of the user device;
obtaining, from the telecommunications network, additional geolocation data indicating a plurality of geolocations of the user device at different times during the period of time;
receiving timestamp data indicating different times at which the user device was at the plurality of geolocations;
populating, at the location service, a data file with indications of the geolocation of the user device and a time at which the user device was at the geolocation;
populating at least one of the data file or one or more additional data files with additional indications of the plurality of geolocations of the user device and the different times at which the user device was at the plurality of geolocations;
signing the data file using a private key associated with the location service to generate a signed data file; and
outputting the signed data file to at least one of the user device or third-party computing device.

12. The method of claim 11, further comprising:
receiving, from the user device, image data representing an image generated by a camera of the user device while the user device was at the geolocation;
verifying, using the image data, that the image was taken at the geolocation; and
populating the data file with the image data prior to signing the data file.

13. The method of claim 11, further comprising:
determining an accuracy value indicating a measure of accuracy associated with the determining the geolocation of the user device; and
populating the data file with the accuracy value prior to signing the data file.

14. The method of claim 11, further comprising:
receiving, from the third-party computing device, a request to determine the geolocation of the user device, the third-party computing device being associated with a user account having privileges to the geolocation of the user device,
wherein the signed data file is output to the third-party computing device.

15. The method of claim 11, further comprising:
receiving, from the user device, a digital fingerprint associated with the user device; and
populating the data file with the digital fingerprint prior to signing the data file.

16. The method of claim 15, further comprising:
receiving, from the user device, a fingerprint associated with a user of the user device; and
populating the data file with the fingerprint prior to signing the data file.

17. The method of claim 11, further comprising:
receiving, via an application executing on the user device, a request for a digitally signed data file attesting to an authenticity of an image taken by the user device;
receiving, from the user device, image data representing the image generated by a camera of the user device while the user device was at the geolocation; and
populating the data file with the image data prior to signing the data file.

* * * * *